No. 726,993. PATENTED MAY 5, 1903.
C. H. SAWYER.
WHEEL SCRAPER.
APPLICATION FILED APR. 3, 1902.
NO MODEL. 3 SHEETS—SHEET 1.
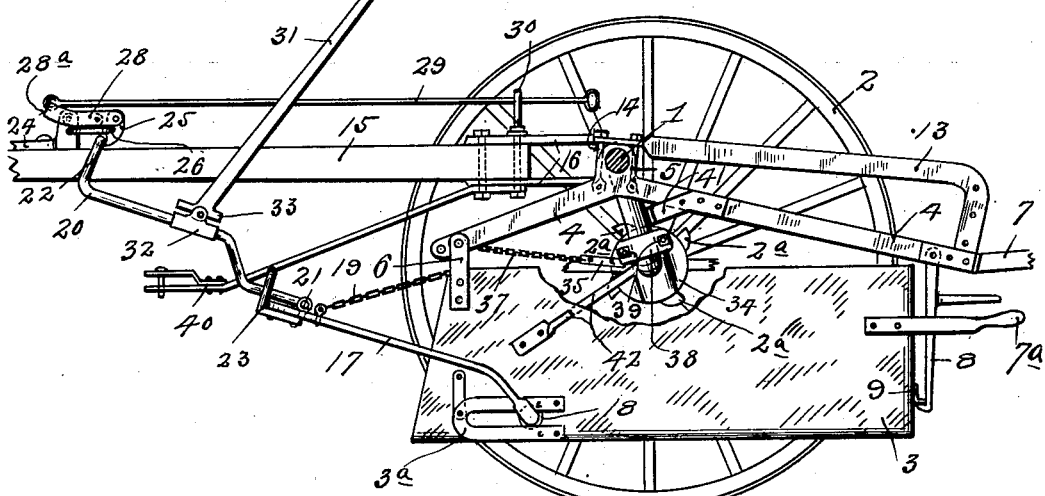
Witnesses.
A. H. Opsahl.
H. D. Kilgore.
Inventor.
Charles. H. Sawyer,
By his Attorneys:
Williamson & Merchant No. 726,993. PATENTED MAY 5, 1903.
C. H. SAWYER.
WHEEL SCRAPER.
APPLICATION FILED APR. 3, 1902.
NO MODEL. 3 SHEETS—SHEET 2.
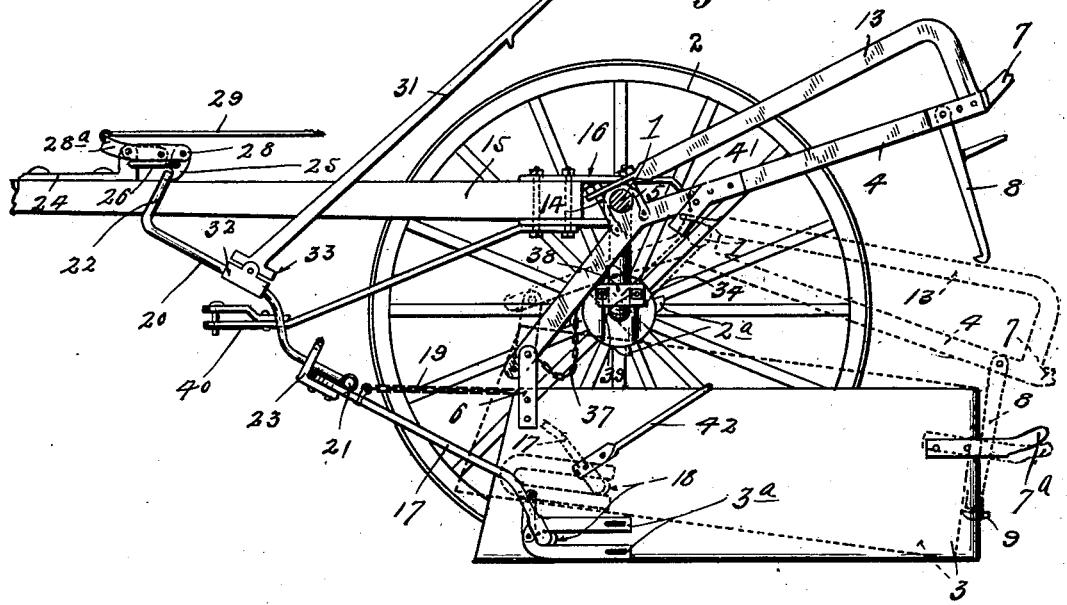
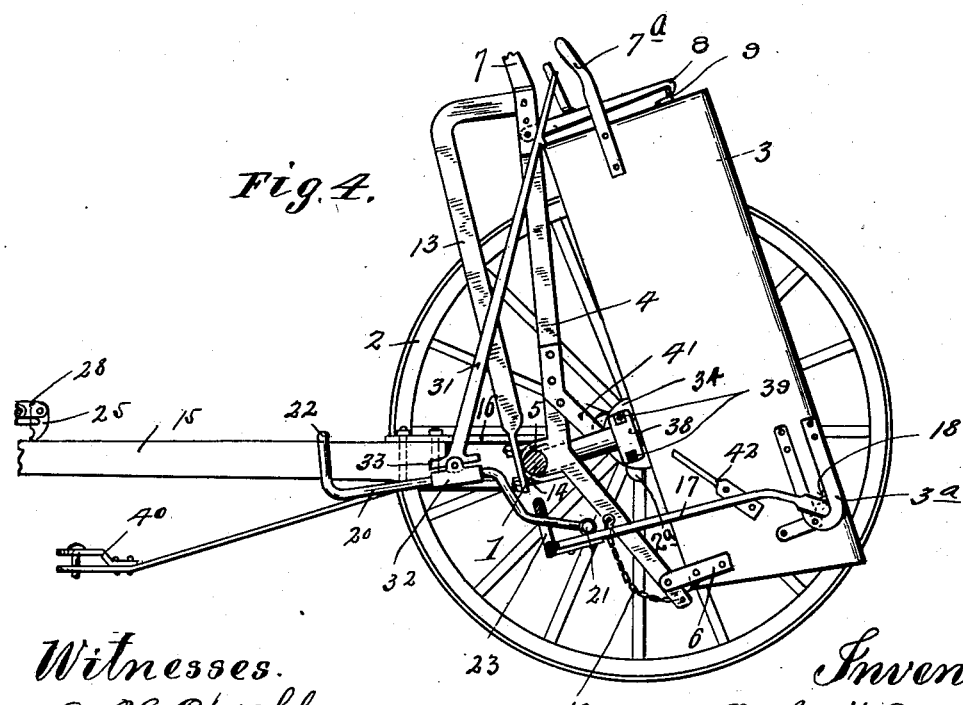
Witnesses.
A. H. Opsahl.
H. D. Kilgore
Inventor.
Charles H. Sawyer
By his Attorneys
Williamson & Merchant No. 726,993. PATENTED MAY 5, 1903.
C. H. SAWYER.
WHEEL SCRAPER.
APPLICATION FILED APR. 3, 1902.
NO MODEL. 3 SHEETS—SHEET 3.
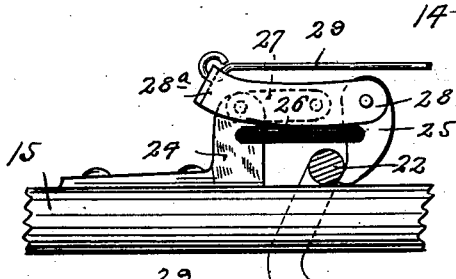
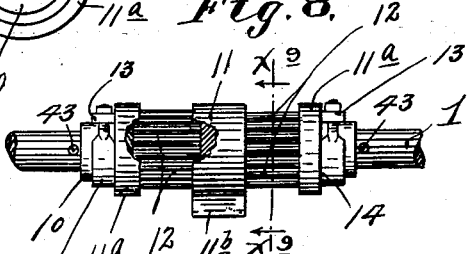
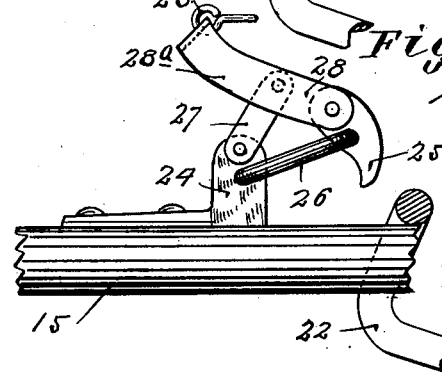
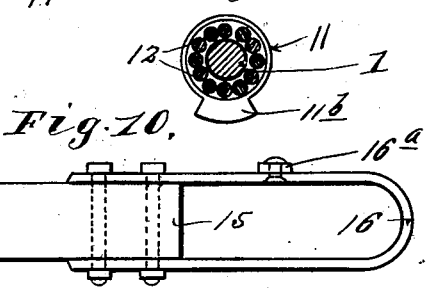
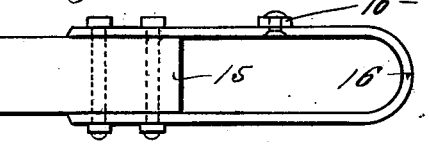
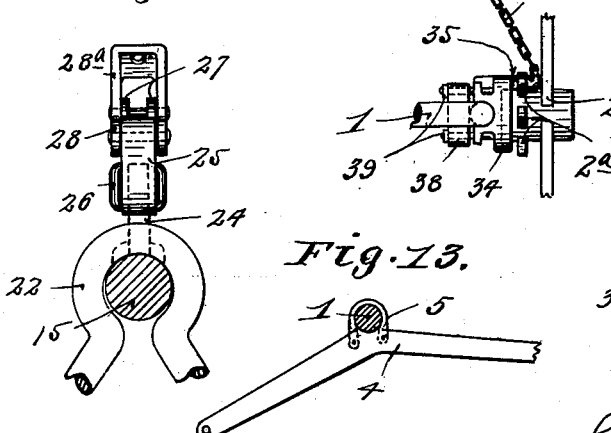
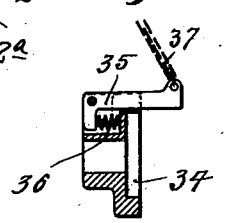
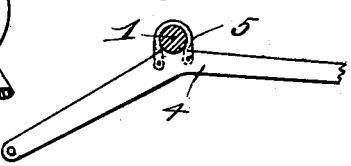
Witnesses.
A. H. Opsahl.
H. D. Kilgore.
Inventor.
Charles H. Sawyer.
By his Attorneys
Williamson & Merchant No. 726,993. Patented May 5, 1903.

UNITED STATES PATENT OFFICE.

CHARLES H. SAWYER, OF MINNEAPOLIS, MINNESOTA, ASSIGNOR OF ONE-HALF TO M. E. SAWYER, OF MINNEAPOLIS, MINNESOTA.

WHEEL-SCRAPER.

SPECIFICATION forming part of Letters Patent No. 726,993, dated May 5, 1903.

Application filed April 3, 1902. Serial No. 101,292. (No model.)

*To all whom it may concern:*

Be it known that I, CHARLES H. SAWYER, of Minneapolis, county of Hennepin, and State of Minnesota, have invented certain new and useful Improvements in Wheel-Scrapers, of which the following is a specification.

My present invention relates to wheeled scrapers, and has for its object to improve the same in the several particulars hereinafter noted.

To such ends the invention consists of the novel devices and combinations of devices hereinafter described, and defined in the claims.

The invention is illustrated in the accompanying drawings, wherein like characters indicate like parts throughout the several views—

Figure 1 is a plan view, with some parts broken away, showing a wheeled scraper embodying the several features of my invention. Fig. 2 is a view, principally in side elevation, with some parts sectioned on the line $x^2\ x^2$ of Fig. 1. Figs. 3 and 4 are views corresponding to Fig. 1, but illustrating different positions of the parts. Fig. 5 is a detail in side elevation showing a lock for the scraper-drag bail. Fig. 6 is a view corresponding to Fig. 5, but showing the lock in a different position. Fig. 7 is a detail in section on the line $x^7\ x^7$ of Fig. 1. Fig. 8 is a detail in plan showing the central portion of the crank-axle and a roll-bearing device applied thereto. Fig. 9 is a section on the line $x^9\ x^9$ of Fig. 8. Fig. 10 is a detail in side elevation showing the rear end of a pole. Fig. 11 is a section on the line $x^{11}\ x^{11}$ of Fig. 6. Fig. 12 is a detail view in plan, with parts broken away, showing one of the clutches for connecting the crank-axle to one of the wheels. Fig. 13 is a section on the line $x^{13}\ x^{13}$ of Fig. 1, and Fig. 14 is a horizontal section through one of the clutches.

As an important feature of my present invention I support the scraper by means of an oscillating lifting-frame which is pivotally mounted on the crank portion of an oscillating crank-axle and provide devices for temporarily locking the crank-axle to the wheels, whereby under advance movement of the machine said lifting-frame is positively forced from a lowered to a raised position, thereby raising the loaded scraper-bowl from the ground.

My invention involves other novel features of construction, all of which will hereinafter be fully described, and defined in the claims.

The numeral 1 indicates the crank-axle, upon the projecting trunnion-like ends of which truck-wheels 2 are mounted in the usual or any suitable way.

The numeral 3 indicates the scraper-bowl, which when raised is suspended from the raised crank portion of the axle by means of an oscillating lifting frame or lever 4. This lifting-frame 4 in plan view is approximately U-shaped, and the intermediate portions of its prongs are pivotally connected to the crank portion of the axle 1, preferably by means of strap-boxes 5. (Best shown in Fig. 13, but also in other views.) The front ends of the prongs of the lifting-frame 4 are pivotally connected to the forward end of the scraper 3, preferably directly to straps 6, rigidly secured on the side of said scraper. At the intermediate portion of its transversely-extended rear bar the frame 4 is provided with a handpiece 7 and a long depending catch-dog 8, the free lower end of which dog is engageable with a detent or flange 9, secured on the rear end of the scraper-bowl 3.

Loosely mounted on the intermediate crank portion of the axle 1 is a sleeve 10, provided with an intermediate flange 11 and end flanges $11^a$. The flanges 11 and $11^a$ are provided on their opposing faces with annular grooves or runways, in which work the ends of rollers 12. (Best shown in Figs. 8 and 9.)

The oscillating lifting frame or lever 4 is preferably further provided with a central brace 13, the rear end of which is rigidly secured to the transverse bar of the frame 4 and the prongs of which are rigidly clamped to the ends of the sleeve 10 by nutted U-shaped clamps 14. (Best shown in Figs. 7 and 8.)

The pole 15 is provided at its rear end with a bifurcated yoke 16, the loops of which work freely one over each series of rollers 12, carried by the crank portion of the axle. (See Figs. 1, 2, 8, and 9.) In this way the pole is mounted with freedom for sliding movements with respect to the crank-axle from the front toward the rear of the machine.

On its sides and near its forward and bottom portions the scraper is provided with U-shaped keepers or brackets 3ª. The bail-section 17 of a drag connection is provided at its rear-turned prongs with buttons or heads 18, which are mounted to slide in the keepers 3ª of the scraper. Chains 19 connect the forward portion of the frame-section 17 to the upper forward portions of the sides of the scraper and limit the downward movement of the said frame to the position indicated in Figs. 2 and 3. A pronged bracket or supplemental bail 20 is pivotally connected at 21 to the forward transversely-extended portion of the bail 17. The forward portion of the said supplemental bail 20 is made in the form of a loop or eye 22, which freely slides upon the rounded rear portion of the pole 15, as best shown in Figs. 2, 4, and 11. The members 17 and 20 are permitted a hinge-like movement one upon the other, which movement, however, is limited by slotted stop-brackets 23, secured to said member 17, as best shown in Figs. 2, 3, and 4. Normally the looped end of the bail 20 is locked forward on the pole by a locking device constructed as follows:

24 indicates a bearing secured to the top of the pole 15.

The numeral 25 indicates a dog which is connected to the bearing 24 by a link 26 and also by a toggle 27 28. The member 28 of the toggle has a forward extension 28ª, which is preferably turned slightly upward. To the upturned end 28ª of said toggle member is attached a trip-rod 29, which extends rearward and, as shown, works through a guide 30 on the rear end of the pole. Normally the loop or eye 22 of the draft connection 20 stands forward of the lower end of the dog 25, as shown in Figs. 2, 3, and 5. (See particularly the latter figure.) In this position of the lock it will be noted the center joint of the toggle stands on or slightly below a dead-center, so that the rearward strains on the depending end of the dog will simply throw the toggle member 28 more tightly into engagement with the link 26, but will not buckle the toggle or release the draft connection 20. The said draft connection may, however, be readily released by drawing rearward on the trip-rod 29, thereby buckling the toggle. When the loop or eye 22 of the draft connection 20 is forced forward or back to normal position, it will engage the lower end of the dog 25 and raise the same with a camming action.

The numeral 31 indicates a long stop-pawl or arm which is pivoted to the draft connection 20, preferably to a block 32, secured on the arm thereof. At its pivoted end the said stop-pawl 31 is provided with an expanded base 33, which limits the pivotal movement of the pawl by engagement with the said block 32. This stop-pawl 31 is adapted to catch the rear upper edge of the scraper-bowl 3 and hold the same in a dumped position, as shown in Fig. 4.

The hubs of the wheel 2 are provided with projections or teeth 2ª. (Best shown in Figs. 1, 2, and 12.) The trunnion portions of the crank-axle 1, adjacent to the hubs of the wheels, are provided with rigidly-secured heads 34, to the peripheral portions of which are pivoted clutch-dogs 35, which are put under strain to engage with the hub teeth or projections 2ª by light springs 36. (See Fig. 14.) The free ends of the dogs 35 are connected by chains or other flexible connections 37 to the sides of the scraper 3, preferably to the projecting strap 6 thereof. These chains 37 are of such length that when the scraper is in the position indicated in Figs. 1 and 2 the dogs 35 will be held out of engagement with the hub-teeth 2ª. The heads 34 have inwardly-spaced and transversely-extended blocks or supplemental sections 38. The said parts 34 and 38 are clamped onto the side sections of the axle 1 by bolts 39.

The numeral 40 indicates a draft connection applied to the under side of the pole and to the forward end of which the horses or draft-animals may be hitched in the ordinary or in any suitable way.

41 indicates stops on the lifting-frame 4, which engage with the sides of the crank-axle and limit the forward movements of said frame and axle.

42 indicates heavy latch-springs secured at their lower ends to the sides of the scraper-bowl 3 and engageable at their upper ends just in front of the crank-arm sections of the axle 1, as best shown in Fig. 2. As long as the pawl 8 engages the detent 9 of the scraper-bowl the stops 41 and latch-springs 42 coöperate to hold the crank-axle and the scraper-bowl against rotary movement the one with respect to the other.

When the scraper is to be hauled from place to place, its bowl 3 is raised and suspended, as illustrated in Fig. 2, in which position, it will be noted, the crank portion of the axle is turned up and forward, and the chains 19 and 37 are drawn taut, thereby straightening out the drag connections 17 to 20 and throwing the dogs 35 into inoperative positions. When the scraper is to be dropped and thrown into action, the dog 8 is released from the detent 9 of the scraper, whereupon the parts assume the position indicated by full lines in Fig. 3. When the scraper has accumulated a load under the forward movement of the machine, the lifting-frame 4 is forced downward, as indicated by dotted lines in Fig. 3, and the pawl 8 is again coupled to the detent 9 of the scraper 3. This movement of the lifting-frame 4, it will be noted, slightly raises the forward end of the scraper and turns the crank portion of the axle backward and downward to an angle of about forty-five degrees. When the lifting frame or lever 4 is rocked as just stated, its parallel side bars or prongs are rocked over the blocks 38 as fulcrums. It also brings the wheels again into contact with the ground and gives sufficient slack to the chains 37 to permit the dogs 35 to engage with the hub-teeth $2^a$, so that under the advance movement of the machine the crank portion of the axle is positively turned upward and forward—that is, back to the normal position indicated in Fig. 2. As is evident, this movement of the crank-axle serves to lift the scraper 3 bodily, together with its load. It should be here remembered that when the scraper 3, the crank-axle 1, and the lifting-frame 4 are in the positions shown in Fig. 2 the chains 37 are drawn taut and the dogs 35 are released from the hub-teeth $2^a$, so that the wheels are then free to rotate without action on the crank-axle. It will be seen that under the above movements the crank portion of the axle vibrates forward and rearward within the yoke 16 of the pole 15 and that the rear end of the pole is held against lateral movements by the cooperating flanges 11 and $11^a$ of the sleeve 10. The sleeve 10 in turn may be held against sliding movements on the crank-axle in any suitable way—as, for instance, by pins 43. (Shown in Fig. 8.) To limit the upward movement of the lifting-lever 4 with respect to the pole, as shown in Fig. 4, the central flange 11 of the sleeve 10 is shown as provided with a stop-lug $11^b$, which engages with the stop-bar $16^a$ on the yoke 16. Before the load can be dumped the section 20 of the drag-bail must be released by tripping the dog 25, as indicated in Fig. 6 and as before described. When this is done, the scraper-bowl, together with the lifting-lever and crank-axle, may be turned into the dumping position indicated in Fig. 4. In making a return trip from the dumping ground the scraper-bowl may be held in its dumped position by the long pawl 31, which catches the upturned rear end of the scraper-bowl, as shown in Fig. 4. In this position of the parts, it will be noted, the drag connection 17 to 20 is buckled downward, so as to clear the crank-axle, and the loop or eye 22 of the bail 20 has slid rearward on the pole to permit the free dumping movement of the scraper.

From what has already been said it will of course be understood that the mechanism above described is capable of considerable modification within the scope of my invention as herein set forth and claimed.

What I claim, and desire to secure by Letters Patent of the United States, is as follows:

1. The combination with a truck having an oscillating crank-axle, of a lifting frame or lever pivoted on the crank portion of said axle, and a scraper-bowl pivotally connected to one end of said lifting-frame and detachably connected to the other end thereof, substantially as described.

2. The combination with a truck having an oscillating crank-axle, of a lifting frame or lever pivoted on the crank portion of said axle, a scraper-bowl pivotally connected to one end of said lifting-frame and detachably connected with the other end thereof, a clutch device operating to connect said crank-axle to the truck-wheels for rotation therewith to raise the scraper, and means for tripping said clutch out of action when said crank-axle has been moved to a predetermined position, substantially as described.

3. The combination with a truck having an oscillating crank-axle, of a lifting frame or lever pivoted on the crank portion of said axle, a scraper-bowl pivotally connected to the forward end of said lifting-frame, a dog detachably connecting the rear ends of said lifting-frame and scraper-bowl, clutches for connecting said crank-axle to the truck-wheels for rotation therewith to raise the scraper, and a clutch-tripping connection rendered operative when the crank-axle reaches its normal position, substantially as described.

4. The combination with a truck involving wheels and a crank-axle, of a scraper-bowl suspended from said crank-axle and movable vertically under oscillations thereof, a drag-bail made up of hinged sections the forward of which slides on the pole of the truck and the rear member of which is connected to said scraper-bowl, flexible connections between said scraper-bowl and said drag-bail for normally preventing buckling of the same, and means for locking the forward section of said drag-bail to the pole and releasing the same, substantially as described.

5. In a scraper, the combination with a truck, of a scraper-bowl suspended from the axle of said truck, a drag-bail for said bowl bent to embrace the rear portion of the pole and slide thereon, and a lock for securing the sliding section of said bail to said pole, and for releasing the same, substantially as described.

6. The combination with a truck, of a scraper-bowl suspended from the axle thereof, a drag-bail for said bowl embracing and sliding on the rear end of the pole, and a lock on said pole for locking and releasing said drag-bail, comprising the support 24, the dog 25, the link 26 and toggle 27 28 connecting said dog to said support 24, and a trip connection to said toggle-lever for buckling the same, substantially as described.

7. The combination with a truck having an oscillating crank-axle, of a lifting frame or lever pivoted on the crank portion of said axle, a fulcrum-block on an end portion of said axle, near one trunnion thereof, against which block the forward portion of said frame works as a fulcrum to rock said crank-axle rearward, and a scraper-bowl pivotally connected to one end of said lifting-frame and detachably connected to the other end thereof, substantially as described.

CHARLES H. SAWYER.

Witnesses:
  MOSES DES LAURIERS,
  EMERSON SAWYER.